United States Patent
Sheftel et al.

(10) Patent No.: US 10,497,182 B2
(45) Date of Patent: Dec. 3, 2019

(54) MIXED REALITY CINEMATOGRAPHY USING REMOTE ACTIVITY STATIONS

(71) Applicant: Blueprint Reality Inc., Vancouver (CA)

(72) Inventors: Benjamin James Sheftel, Vancouver (CA); Tryon Williams, West Vancouver (CA)

(73) Assignee: Blueprint Reality Inc., Vancouver (CA)

( * ) Notice: Subject to any disclaimer, the term of this patent is extended or adjusted under 35 U.S.C. 154(b) by 0 days.

(21) Appl. No.: 16/148,225

(22) Filed: Oct. 1, 2018

(65) Prior Publication Data

US 2019/0102949 A1   Apr. 4, 2019

Related U.S. Application Data

(60) Provisional application No. 62/567,672, filed on Oct. 3, 2017.

(51) Int. Cl.

| | |
|---|---|
| *G06T 19/00* | (2011.01) |
| *H04N 5/265* | (2006.01) |
| *H04N 5/247* | (2006.01) |
| *G06T 15/20* | (2011.01) |
| *G06T 13/40* | (2011.01) |
| *B64C 39/02* | (2006.01) |
| *H04N 5/45* | (2011.01) |
| *H04N 5/222* | (2006.01) |
| *H04N 5/445* | (2011.01) |

(Continued)

(52) U.S. Cl.
CPC .......... *G06T 19/006* (2013.01); *B64C 39/024* (2013.01); *G06T 13/40* (2013.01); *G06T 15/20* (2013.01); *G06T 19/003* (2013.01); *H04N 5/2224* (2013.01); *H04N 5/247* (2013.01); *H04N 5/265* (2013.01); *H04N 5/45* (2013.01); *B64C 2201/127* (2013.01); *G06K 9/00228* (2013.01); *G06T 2219/024* (2013.01); *H04N 5/44504* (2013.01); *H04N 5/76* (2013.01)

(58) Field of Classification Search
None
See application file for complete search history.

(56) References Cited

U.S. PATENT DOCUMENTS

| | | | |
|---|---|---|---|
| 2005/0110789 A1* | 5/2005 | Le Ouay | A63F 13/10 345/419 |
| 2009/0110241 A1* | 4/2009 | Takemoto | G06K 9/32 382/103 |

(Continued)

*Primary Examiner* — Frank S Chen
(74) *Attorney, Agent, or Firm* — Damien G. Loveland (57) ABSTRACT

A movie set is divided into at least a directing station and a set station, remote from each other. Actors are either in their own remote acting station or, if the director is also the cameraman, in the directing station. At the set station, a digital record of a real or virtual scene is created. Actors are recorded separately from the set and composited into the scene as they are acting. A real camera films the actor, who is automatically composited into the scene. A virtual camera films the actor and the virtual scene. Cameramen filming the actors wear virtual reality headsets, so they inhabit the virtual or pre-recorded real world into which the actors are composited, in real time. Virtual viewfinders are displayed in the headsets to show the image that the camera is capturing.

41 Claims, 7 Drawing Sheets

(51) Int. Cl.
*G06K 9/00* (2006.01)
*H04N 5/76* (2006.01)

(56) References Cited

U.S. PATENT DOCUMENTS

| | | | | |
|---|---|---|---|---|
| 2009/0296985 | A1* | 12/2009 | Lv | G06T 7/285 |
| | | | | 382/103 |
| 2010/0091036 | A1* | 4/2010 | Wright | G06T 19/006 |
| | | | | 345/633 |
| 2013/0257907 | A1* | 10/2013 | Matsui | G09G 5/377 |
| | | | | 345/633 |
| 2015/0340066 | A1* | 11/2015 | Lokshin | G11B 27/031 |
| | | | | 386/201 |
| 2016/0343164 | A1* | 11/2016 | Urbach | G06T 19/006 |
| 2016/0343166 | A1* | 11/2016 | Inoko | G06T 19/006 |
| 2017/0160751 | A1* | 6/2017 | Pierce | G05D 1/101 |
| 2017/0266554 | A1* | 9/2017 | Marks | A63F 13/352 |
| 2018/0288354 | A1* | 10/2018 | Anderson | G06T 11/60 |
| 2019/0018567 | A1* | 1/2019 | Murphy | G06F 3/04815 |

* cited by examiner

MIXED REALITY CINEMATOGRAPHY USING REMOTE ACTIVITY STATIONS

CROSS-REFERENCE TO RELATED APPLICATIONS

This application claims the benefit of U.S. provisional patent application Ser. No. 62/567,672, filed on Oct. 3, 2017, which is incorporated by reference herein in its entirety.

TECHNICAL FIELD

The present invention relates to the field of immersive technology. More specifically, it relates to the use of mixed reality technology and activity stations that are remote from each other to create mixed reality videos and movies.

BACKGROUND

Virtual reality (VR), augmented reality (AR) and mixed reality (MR) are technologies where the interface between the real physical world and the digital world is developed in an effort to improve the communication between humans and technology, and to create more immersive digital worlds.

In particular, mixed reality technology is the most recent advancement in the field of immersive technology, wherein content from the digital and physical worlds can interact with each other. The concept of mixed reality was first introduced in 1994 by Paul Milgram and Fumio Kishino. It could be defined as a way of creating new technological environments and functionalities from the interaction of physical and digital objects.

In various industries such as the movie industry and the video game industry, the implementation of mixed reality technology is the source of new economic markets. Indeed, the economic success of these industries, in particular the video games industry, is greatly tied to technological advancements and more immersive interaction between the user/spectator and the game/movie. More specifically, the combination of computer processing, human input and environmental input in order to improve the immersive experience of the user is at the center of this technological advancement.

Moreover, new applications and functionalities may be created by the implementation of mixed reality technology in the social communication field. For example, collaboration may be established between workers regardless of their location. Multiple new applications of this technique can be developed and thus enhance the way people interact with each other and improve their daily life.

Mobile devices, televisions and monitors are the primary global medium for communication. However, virtual reality and augmented reality experiences are very difficult to communicate via mobile devices and televisions. The advent of mixed reality allows us to communicate the virtual world to a 2D screen.

Immersive computing has enabled advances in virtual cinematography which radically change the way filmmaking can be done. As such, it is becoming more and more important for the traditional 2D filmmaking industry to pay heed to the growing field of immersive computing, otherwise there is the risk that such filmmaking will lose popularity.

Many tools are available today to assist with the production and enjoyment of immersive video, such as VR headsets, controllers, motion trackers that can be worn or attached to a device, tracked cameras, depth cameras, chromakeying, static subtraction, post-processing software and ever increasing computing power. However, the post-production of mixed reality is expensive, time consuming, and it does not provide for on-the-fly iteration or any immediate feedback loop.

Mixed reality has uses in e-sports, live performances, virtual reality arcades, video production, communication and business.

This background information is provided to reveal information believed by the applicant to be of possible relevance to the present invention. No admission is necessarily intended, nor should be construed, that any of the preceding information constitutes prior art against the present invention.

SUMMARY OF INVENTION

The inventors have recognized that the overlap between filmmaking, tracked immersive computing and mixed reality provides the groundwork for new virtual cinematography workflows. The present invention is directed to a method and a system for implementing mixed reality technology in a movie set context. The movie set is divided into remote stations, which may be networked together. For example, the set is composed of three stations such as the acting station, the directing station and the set design station. Each of these stations may not be located at the same physical location as the others, and none may be close to any other. Mixed reality techniques are used by various professionals working on the movie set, such as the director, the actors and the technicians, many of them wearing virtual reality headsets. These various professionals can thus collaborate while being at different locations and seeing the same virtual set configuration, all communicating in real time, and working to produce the film in real time.

With this method, the acting station may, for example, be located remotely from the director station. The director usually, but not always, wears a VR headset and the cameramen that film the actors always wear a VR headset. This way, all the professionals are provided full awareness of the chosen filming scene, and can see the actors projected into it on the fly using mixed reality technology. Moreover, changes suggested by the director can be implemented in real time at the remote acting station or in the VR set, and post-production treatments are possible as well.

The system may be implemented with a standard Vive™ system, a camera, a tracker, and MixCast vCinema™. It can be implemented for all levels of experience and/or budget, from independent to professional, and has uses in the pre-visualization, recording and post-processing stages of mixed reality cinematography. Post-processing may be performed, if necessary, with the Unity™ Editor or another compositing or rendering engine such as Adobe After Effects™ to adjust lighting, bloom, colors, depth of field, rendering, shading etc.

Disclosed is a method for filming a video comprising the steps of: at a first location, creating a digital record of a scene; at a second location remote from the first location, capturing video imagery of an actor; and compositing a representation of the actor taken from the video imagery into the digital record of the scene to form a composited scene. The video imagery of the actor is captured by recording the actor with a real camera while an operator of the real camera wears a virtual reality (VR) headset. The method includes concurrently displaying, in the VR headset: a first view of the composited scene that corresponds to a position and orientation of the VR headset relative to a virtual world that is formed by the digital record of the scene; and a virtual viewfinder displaying a second view of the composited scene that corresponds to a position, orientation and field of view of the real camera relative to the virtual world.

Also disclosed is a system for filming a video comprising: a computing device at a first location configured to create a digital record of a scene; a real camera at a second location remote from the first location configured to capture video imagery of an actor; a processor communicatively connected to the real camera and configured to access the digital record of the scene and composite a representation of the actor taken from the video imagery into the digital record of the scene to form a composited scene; and a virtual reality (VR) headset at the second location connected to the processor. The VR headset is configured to display, to an operator of the real camera while the real camera records the actor: a first view of the composited scene that corresponds to a position and orientation of the VR headset relative to a virtual world that is formed by the digital record of the scene; and a virtual viewfinder displaying a second view of the composited scene that corresponds to a position, orientation and field of view of the real camera relative to the virtual world.

DESCRIPTION

A. Glossary

The term "virtual reality (VR)" refers to a scene that is entirely computer-generated and displayed in virtual reality goggles or a VR headset, and that changes to correspond to movement of the wearer of the goggles or headset. The wearer of the goggles can therefore look and "move" around in the virtual world created by the goggles.

The term "mixed reality (MR)" refers to the creation of a video of real-world objects in a virtual reality scene. For example, an MR video may include the image of a person playing a virtual reality game composited with the computer-generated scenery in the game that surrounds the person.

The term "image" is generally used herein to refer to a moving image, such as a video or movie. The term "video imagery" is used more generally to refer to one or more video images that are taken of the same subject, such as an actor.

The term "module" can refer to any component in this invention and to any or all of the features of the invention without limitation. A module may be a software, firmware or hardware module, and may be located in a user device, camera, tracker, controller, headset or a server.

The term "network" can include both a mobile network and data network without limiting the term's meaning, and includes the use of wireless (e.g. 2G, 3G, 4G, WiFi, WiMAX™, Wireless USB (Universal Serial Bus), Zigbee™, Bluetooth™ and satellite), and/or hard wired connections such as local, internet, ADSL (Asymmetrical Digital Subscriber Line), DSL (Digital Subscriber Line), cable modem, T1, T3, fibre, dial-up modem, television cable, and may include connections to flash memory data cards and/or USB memory sticks where appropriate. A network could also mean dedicated connections between computing devices and electronic components, such as buses for intra-chip communications.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by an application, code or a module. The processor, if comprised of multiple processors, may be located together or geographically separate from each other. The term includes virtual processors and machine instances as in cloud computing or local virtualization, which are ultimately grounded in physical processors.

The term "real-time" is used to refer to the actual time at which an event or process occurs, subject to the unavoidable time-lag in the electronics used for capturing, processing, transmitting and displaying data and images.

The term "remote" or derivations of it are used to refer to locations that are physically separate from each other, such as in different countries, in different cities, in different buildings, or in different rooms in the same building, but not in the same room and not in the same outdoor location such as an outdoor set.

The term "system" when used herein refers to a system for enabling mixed reality cinematography using remote sites concurrently, the system being the subject of the present invention.

B. Overview

Figure 1:
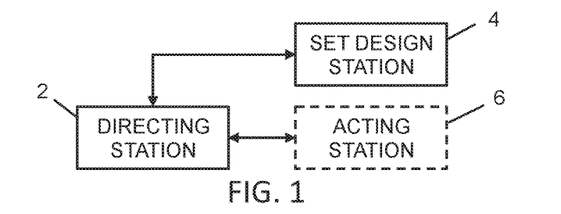
FIG. 1 shows the division of the movie set according to an embodiment of the present invention.

In relation to the invention disclosed herein, there are four main parties concerned with making a movie, these being the set designer, the actor, the cameraman and the director. In some cases the director is the same person as the cameraman, the set designer, or both the cameraman and the set designer. Referring to FIG. 1, the movie set is divided into at least a directing station 2 and a set design station 4. The set is either a virtual set or a real set, and in either case it is remote from the directing station. Actors can either be in their own acting station 6 remote from the directing station or, in cases where the director is also the cameraman, in the directing station.

C. Exemplary Embodiments

In all cases, the cameraman filming the actor wears a VR headset as he needs to inhabit the virtual world. The aim of the cameraman is to frame and film the actor in relation to the virtual world, or a pre-recording of the real world. To this end, the VR headset of the cameraman filming the actor displays the virtual environment, an image of the actor com posited into the virtual environment, and one or two viewfinders. The first viewfinder shows the cameraman's real camera view of the actor com posited into the virtual environment, in real-time. The second viewfinder show the same angle as the first viewfinder but it includes only the real-world view as captured by the camera, i.e. without the virtual scene.

Figure 2:
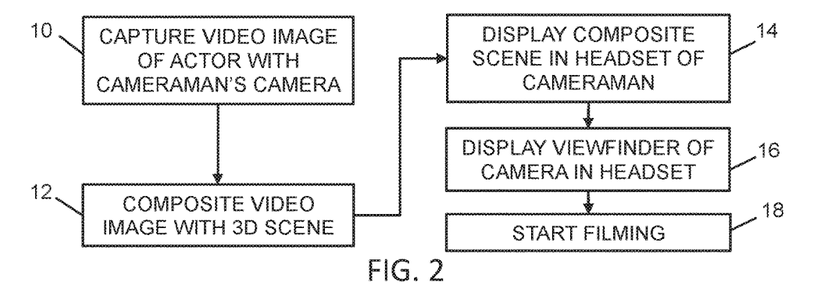
FIG. 2 shows a flowchart of a process undertaken by the system in relation to a cameraman, according to an embodiment of the present invention.

Referring to FIG. 2, a process carried out by an exemplary embodiment of the system is shown. First, a cameraman's camera captures video imagery of an actor, in step 10. In step 12, the system composites a representation of the actor taken from the captured imagery into a digital record of a scene, after first removing the background from the captured imagery. The scene is either a virtual 3D scene, a recording of a real scene or a 3D model of a real scene, and is generally authored at a location remote from the actor.

Figure 7:
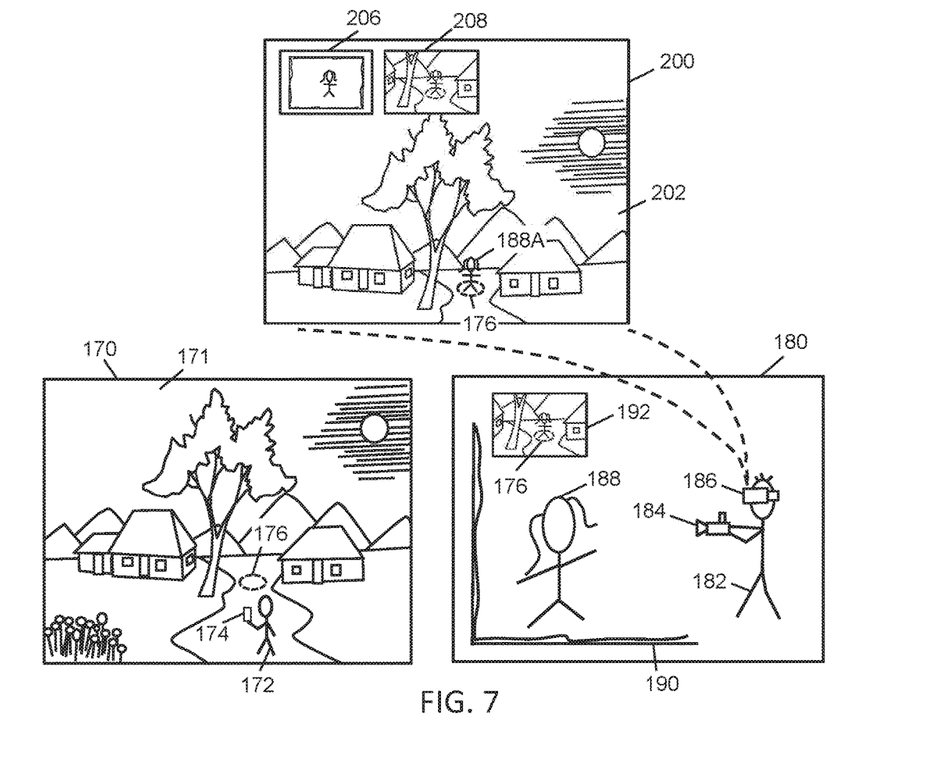
FIG. 7 is a schematic representation of two remote stations of a movie set and the view displayed in the VR headset used at the director/cameraman station, according to the second use-case.

In step 14, the composited scene is displayed in the headset of the cameraman. The com posited scene corresponds to a position and orientation of the VR headset relative to a virtual world that is formed by the digital record of the scene. The composited scene is, for example, like the type of view shown at 80 (FIG. 5) or 200 (FIG. 7). The cameraman effectively inhabits the composited scene and can look around in the composited scene by moving his head to move the headset.

In step 16, the cameraman's camera view of the actor, composited into the portion of the virtual scene corresponding to the camera's position, orientation and field of view, is shown as a virtual viewfinder screen located in the virtual world. The viewfinder in the virtual world may be part of the virtual world, in a fixed location in it, it may move around with the cameraman as he moves around in the virtual world, or it may be overlaid in a fixed position on the view of the virtual world displayed in the cameraman's headset. The viewfinder screen is derived from the composited scene, the location and pointing direction of the camera, and the field of view of the camera.

In step 18, the cameraman then uses his camera to start filming the MR scene, and can move the camera around to capture views of the actor and virtual scene from different angles, and zoom in and out, the virtual background being adjusted automatically by the system to correspond to the camera's location, point of view and field of view. The system therefore allows the cameraman to film with a real camera as if he were inhabiting the MR world. At any point, screen shots and video clips can be captured to provide material for storyboarding and super-rough cuts.

Figure 3:
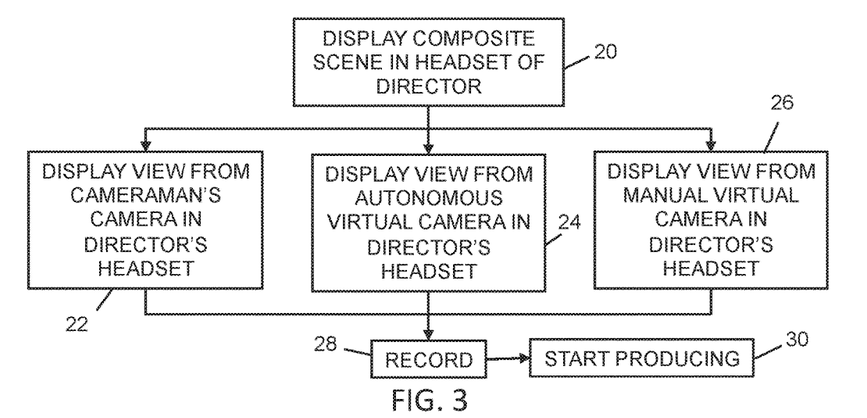
FIG. 3 is a flowchart of a process undertaken by the system in relation to a director, according to an embodiment of the present invention.

Continuing with FIG. 3, a process is shown that is carried out by the system in relation to the headset worn by the director. In this case, the director is a different person to the cameraman, and the process occurs simultaneously with the process of FIG. 2. In step 20, the 3D composited MR scene is displayed in the headset of the director. The director sees the MR world as if he were inhabiting it, so that he can see the VR background or set as well as the actor composited into the VR scene. Overlaid on the view presented to the director, or included in the VR scene presented to the director, are multiple virtual screens, each representing a different, real-time camera shot.

In step 22, the system displays, on one of the virtual screens, the MR view corresponding to the angle of the cameraman's real camera, i.e. the MR shot that the cameraman is currently filming.

In step 24 the system displays, on another of the virtual screens in the director's headset, a view of the MR scene shot from a different angle by an autonomous virtual camera in the virtual world. The virtual camera may, for example, provide an overhead shot of the actor in the virtual scene. In order to present a realistic MR view of the actor from above, additional physical cameras may be used in some embodiments to capture views of the actor from different angles to that of the cameraman, so that a more complete, 3D representation of the actor is obtained for compositing into the virtual world.

In step 26 the system displays, on a third virtual screen within the director's headset, an MR view that corresponds to a second virtual camera present in the MR scene. The second virtual camera is at a position and angle that corresponds to the position and angle of a controller that is held by a second cameraman who is wearing a VR headset and is present in the same MR world as the director and first cameraman. The second cameraman inhabits the MR world, and is able to film shots of the actor already composited in the MR world, without the actor actually being present on site with the second cameraman. The second cameraman may be either at the same physical location as the director, or in a location that is remote from that of the director. The director and second cameraman communicate with each other via an audio link so that the director can give filming instructions to the second cameraman.

Steps 22, 24, and 26 occur simultaneously, and all shots are recorded simultaneously in step 28, which then allows the director to cut from one shot to the other during production of the movie in step 30. However, the director may, if desired, create the production in real time by cutting from one shot to the other as the recording takes place.

Figure 4:
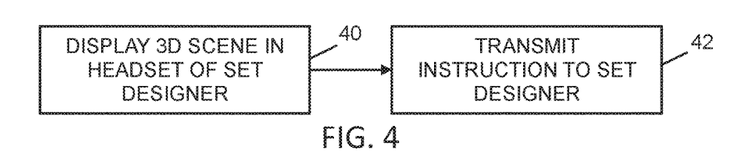
FIG. 4 is a flowchart of a process undertaken by the system in relation to a set designer, according to a first use-case of an embodiment of the present invention.

Referring to FIG. 4, a process is shown of the system in relation to a set designer (or set dresser) that is remote from both the director and the actor. In step 40, the system displays the composited 3D MR scene in a headset that is worn by the set designer. The set designer inhabits the MR world and is able to move, recolor, resurface, resize, add and remove virtual props from the MR scene. Normally, a set is prepared before filming starts, but there are often last minute adjustments that are required once filming starts. The set designer and the director are in audio communication with each other so that, in step 42, the system can transmit instructions from the director to the set designer to adjust the props or otherwise modify the set in real time.

Figure 5:
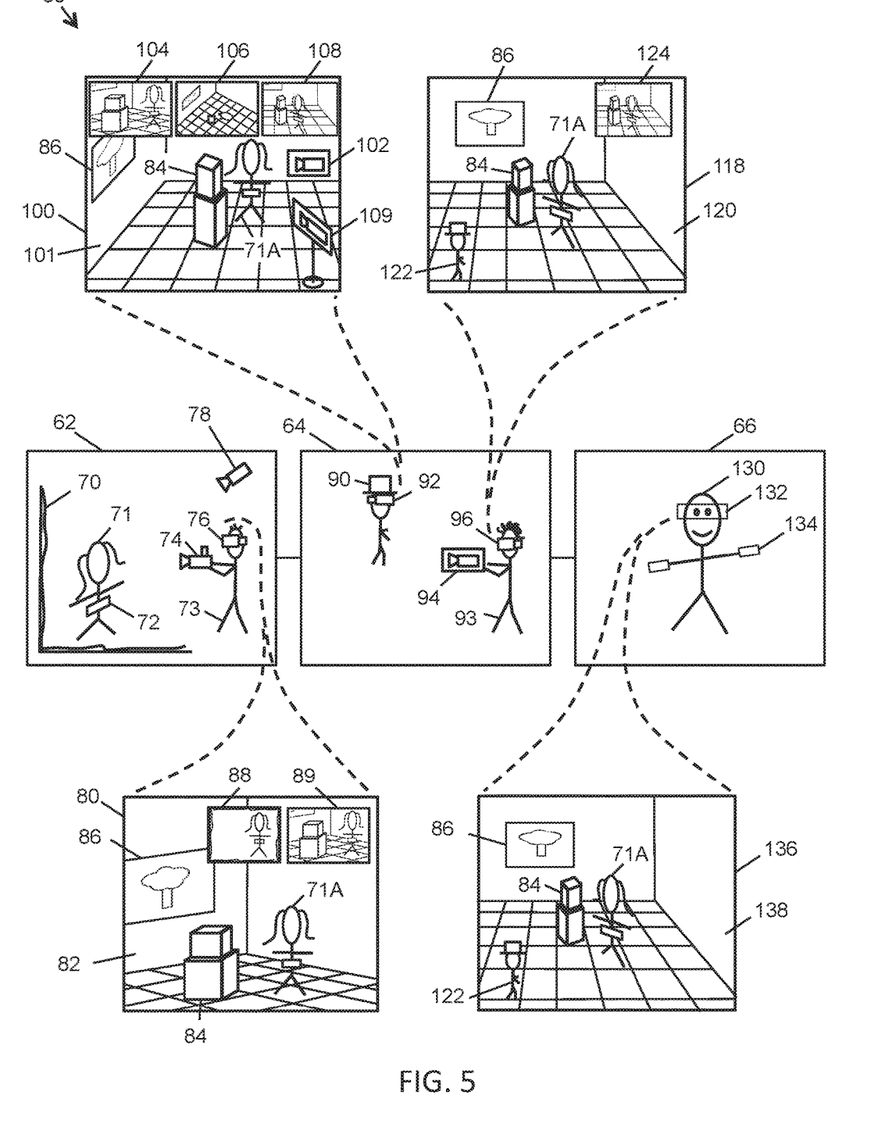
FIG. 5 is a schematic representation of three remote stations of a movie set and the views displayed in the VR headsets used at the stations, according to the first use-case.

Referring to FIG. 5, an exemplary embodiment of a distributed movie set 60 is shown according to a first use-case. The distributed movie set 60 includes an acting station 62, a director station 64 and a set design station 66, each located remotely from the other.

The acting station 62 includes a green screen 70 behind an actress 71 who is wearing a single tracker 72. The tracker 72 allows the position of the actress 71 to be monitored by the system. A cameraman 73 is present at the acting station, operating a real, tracked depth camera 74 and wearing a VR headset 76. The cameraman 73 uses MixCast™ for example, to film the actress 71 in mixed reality.

At the acting station 62, the headset 76 of cameraman 73 displays a stereoscopic MR view 80 (camera-facing projection view), which is an MR view 82 of a virtual scene composited with an image 71A of the actress 71. The virtual scene includes props such as blocks 84 and a picture 86. Overlaid on the MR view 82 are two viewfinders 88, 89. Viewfinder 88 shows an actual view as captured by the real camera 74, showing an image of the actress in front of the green screen background. Viewfinder 89 is shows a view of the MR world according to the position and angle of the camera 74, including the virtual elements such as the blocks and picture, and a com posited image of the actress.

The acting station 62 includes one or more additional real cameras 78 that provide further images of the actress 71 in order for the system to build a more accurate 3D representation of the actress in the virtual world.

If there are no additional cameras 78, then provided that the camera 74 captures a complete view of the actress 71, the actress can be fully com posited into the virtual scene. If, however, only a partial view of the actress 71 is captured by the camera 74, then the remainder of the actress can either be omitted from MR view 82 or completed with a 3D model of the actress.

The directing station 64 shows a director 90 wearing VR headset 92. Also present is a second cameraman 93 operating a tracked controller 94 and wearing a VR headset 96. The director 90 is in two-way audio communication with personnel at the acting station 62 and the set design station 66.

At the directing station 64, the director 90 sees in his headset 92 a view 100, which includes an MR view 101 of the virtual scene composited with an image 71A of the actress 71. Visible in the MR scene 101 are the blocks 84 and the picture 86. The MR scene 101 also includes 3D geometry (i.e. a symbol) representing a virtual camera 102 at a position and orientation that either corresponds to the position of the tracked controller 94 operated by the second cameraman 93, or is controlled by the controller 94. As such, the director 90 is able to visualize in the MR world the actress projected into the scene, the props in the set and the relative locations of the first and second cameramen, including their filming directions. Optionally, another camera representation 109 is included in MR view 101 to represent the position and orientation of the real camera 74. By configuring the motion of the virtual camera 102 to be at a larger scale than the tracking coordinates of the tracked controller (ex: 10:1), cameraman 93 is able to create helicopter or crane shots on the fly by manipulating the controller 94.

The headset 92 of the director 90 also displays three virtual screens 104, 106, 108, overlaid on the MR scene 101. Virtual screen 104 shows the same view as in viewfinder 89 in the headset 76 of the cameraman 73, which is a view of the actress 71 composited into the VR scene corresponding to the angle of the real camera 74. Virtual screen 106 is a view as captured by an autonomous virtual camera in the virtual world, such as a virtual camera that can provide an overhead shot of the com posited actress as shown here. The path of the virtual camera may be predefined, defined in relation to the position and/or actions of the actress, defined in relation to props in the virtual world, or it may be at a fixed position. Virtual screen 108 is a view as seen in the viewfinder for virtual camera 102. The display 100 allows the director 90 to inhabit the MR world and see at the same time the various shots that are being taken by the various real and virtual cameras.

Still referring to the directing station 64, the second cameraman 93 sees in his headset 96 a view 118, which includes an MR view 120 of the virtual scene composited with a view 71A of the actress. Visible in the MR scene 120 are the VR blocks 84 and the picture 86. The MR scene 120 also includes an avatar of the director 122 at a position that corresponds to the position of the director 90. As such, the second cameraman 93 is able to visualize in the MR world the relative locations of the actress, the props in the set and the director.

The headset 96 of the cameraman 96 also displays a virtual screen 124, overlaid on the MR scene 120. Virtual screen 124 shows the same view as in viewfinder 108 in the headset 92 of the director 90, which is a view of the actress 71 composited into the VR scene corresponding to the angle of the virtual camera 102.

The set design station 66 accommodates a set designer 130 wearing a VR headset 132 and holding tracked controllers 134. The tracked controllers 134 allow the set designer 130 to move virtual objects around in the MR scene, such as the blocks 84 and the picture 86. The set designer 130 may use Unity Editor VR™, for example, and takes set layout direction from director 90 (and anyone else), and making immediate changes to the digital assets which are visible to all the participants whether in VR or viewing composited shots on 2D monitors. The positioning of the props can be stored for each shot in case further filming is required.

At the set design station 66, the set designer 130 sees in his headset 132 a view 136, which includes an MR view 138 of the virtual scene composited with an image 71D of the actress 71. Visible in the MR scene 138 are the blocks 84 and the picture 86. The MR scene 138 also includes an avatar 122 of the director 90 at a position that corresponds to the position of the director. As such, the set designer 130 is able to visualize in the MR world the relative locations of the actress, the props in the set and the director, and is able to reposition the props using the controllers 134. Optionally symbols of the camera 74 and/or the virtual camera 102 are included in the view 136 that is presented to the set designer. The set designer can perceive, navigate, and manipulate the virtual environment from whatever scale is most effective for themselves, such as 'giant-scale', to increase efficacy.

Figure 6:
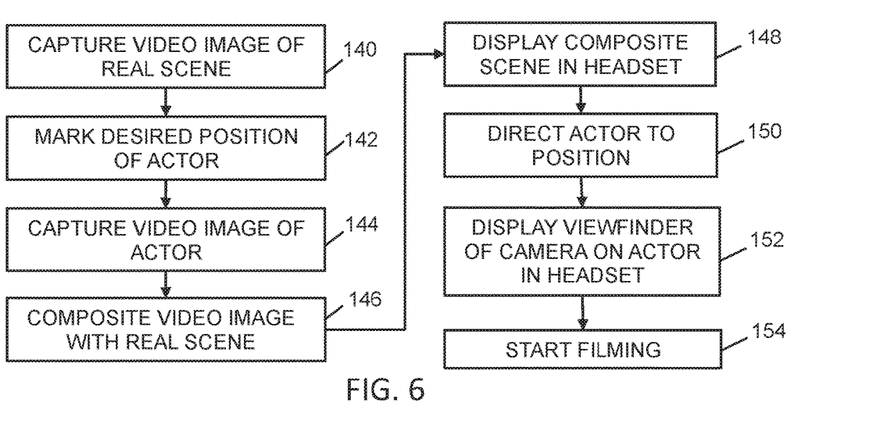
FIG. 6 is a flowchart of a process undertaken by the system when the set is a real set that is remote from the acting station, according to a second use-case of an embodiment of the present invention.

Now referring to FIG. 6, a flowchart of a second use-case is shown, in which there are two remote stations, which are a real-world location and an acting station. The cameraman and the director are the same person. For the purposes of the present application, the on-site location may be considered to be a set. In step 140, a cameraman/director with a real camera captures a real-world scene in which it is desired to composite an actor. The scene can be captured with the camera in a static position, or the camera can be panned and/or zoomed.

In step 142, the cameraman/director marks the desired position of the actor in the recorded scene in 3D space. The mark should be located on the ground, so an estimation of where the ground is will be required to determine its position. Now, at another location, perhaps in a studio, a video image of the actor is recorded in step 144 by the cameraman/director. The image of the actor is, in step 146 and concurrently with step 144, composited with the recorded real-world scene. In step 148 the composite scene is displayed in the headset of the cameraman/director, as an approximation of the real scene captured previously, since 3D information may not be provided. The cameraman/director then, in step 150, is able to direct the actor to the marked position in the scene, or otherwise adjust the relative locations of the composited actor and the scene so that the actor is located at the marked location. The adjustment may be made, in another embodiment for example, by sending an instruction to a set designer.

In step 152 a virtual screen is overlaid on the composited scene presented to the cameraman/director in his headset. This virtual screen displays the viewfinder of a real camera that the cameraman/director is filming the actor with. The cameraman/director is then ready to start filming, in step 154, an MR video of the actor composited in real-time into the pre-recorded real scene, just as if the pre-recorded real scene were a virtual world. The advantage the system provides in this embodiment is that only the cameraman/director need travel to the real-world location and not the actors, and not any support crew that may be needed to bring in and set up additional props. Additional, virtual props that emulate real-world props can be added to the recording of the real-world location by a set designer. Alternately, a 3D model of the recorded scene is generated and played back to the cameraman/director in place of the real scene when filming the actor.

Referring to FIG. 7, the two remote stations referred to in FIG. 6 are shown, these being the real-world location 170 and the acting station 180.

At the real-world location 170, which could be a natural scene 171 or a street scene, with or without other people, animals or moving objects, the cameraman/director 172 is shown holding a real camera 174, which in this case is a smartphone camera. The dotted circle 176 represents the position that a com posited image of an actress should be in the final video. The cameraman/director 172 films the shots using the smartphone camera 174 (e.g. with MixCast AR™) as if the actors were in the scene, including moving the camera for tracked shots.

At the acting station 180, remote from the real-world location 170, a cameraman 182 (who in another embodiment could be cameraman/director 172) is shown operating real camera 184 and wearing VR headset 186. The cameraman 182 is filming an actress 188 with a green screen background 190. The actress 188 does not need to wear a tracking device in this embodiment because she can be directed to the intended position by the director or cameraman. Present in the acting station 180 is a real display screen 192, which shows a view of the composited scene (actress plus recording of scene 171) that corresponds to the field of view of the real camera 184. The displayed scene on screen 192 allows the actress 188 to see her positioning in real-time, and see a playback of each take of her acting. Multiple takes can be made without the expense of spending additional time at the real-world location 170. The display optionally shows the marker 176 representing the intended location of the actresses in the pre-recorded scene.

At the acting station 180, the headset 186 of the cameraman 184 displays a view 200, which is a playback of the pre-recorded scene 202 that was captured at the remote, real-world location 170. The displayed view 200 includes a real-time image 188A of the actress 188 and the marker 176 of the intended position of the actress in the scene. Overlaid on the pre-recorded scene 202 are two viewfinders 206, 208. Viewfinder 206 displays the real-time, real-world view of the image captured by real camera 184, i.e. an image of the actress and the green screen background. Viewfinder 208 shows a view of the portion of the pre-recorded scene, according to the position, angle and field of view of camera 184, including the composited image of the actress and the marker of the intended position of the actress. By wearing a VR headset 186, the cameraman 182 can understand the location and vector of the camera 174 used to create the previously recorded footage.

Figure 8:
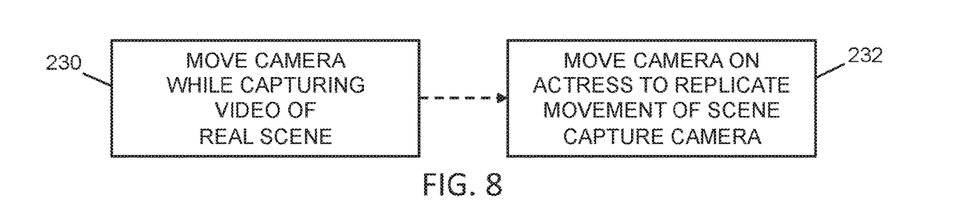
FIG. 8 is a flowchart of a process the cameraman undertakes in the movie set of FIG. 7, according to an embodiment of the present invention.

If the camera 174 was moved while the original scene 171 was being recorded, then the playback 202 to the cameraman 182 will also move in a corresponding fashion. The aim of the cameraman 182 is then to move the real camera 184 to track the original motion of camera 174, by moving his headset 186 (and camera 184 correspondingly) such that the pre-recorded scene 202 as displayed in his headset 186 remains static, i.e. the cameraman 182 adjusts his position and orientation as if he were inhabiting a static, pre-recorded world. Referring to FIG. 8, a process is shown for matching camera movements. In step 230, the camera 174 is moved while capturing a video of a real-life scene. In step 232, camera 184, when filming the actress, is moved to replicate the movement of camera 174. It is sufficient for the camera 184 to closely match the motion of the recording camera 174, as corrections to the relative positioning, relative angle and level of zoom can be corrected digitally during post-processing.

In other embodiments, there may be additional cameras at the acting station. With one depth camera, quality and composition flexibility increases, and with more depth cameras, the cameraman 184 is not needed as the previous camera movement aimed at the projection will now be correct in most cases due to the volumetric representation achievable with that amount of spatial information.

In other embodiments, additional actors can be recorded and composited into the pre-recorded scene with the already composited actress. A marker for each additional actor is added to the scene. In this case, it is more convenient for sorting to have each of the additional actors wear a tracker if they are moving around the scene significantly. As the additional actors are added in layers, after the addition of prior ones, each can see an image of themselves in real-time on screen 192, composited into the already-recorded layers of the scene, so that, if desired, they may act in reaction to the previously recorded actors.

Figure 9:
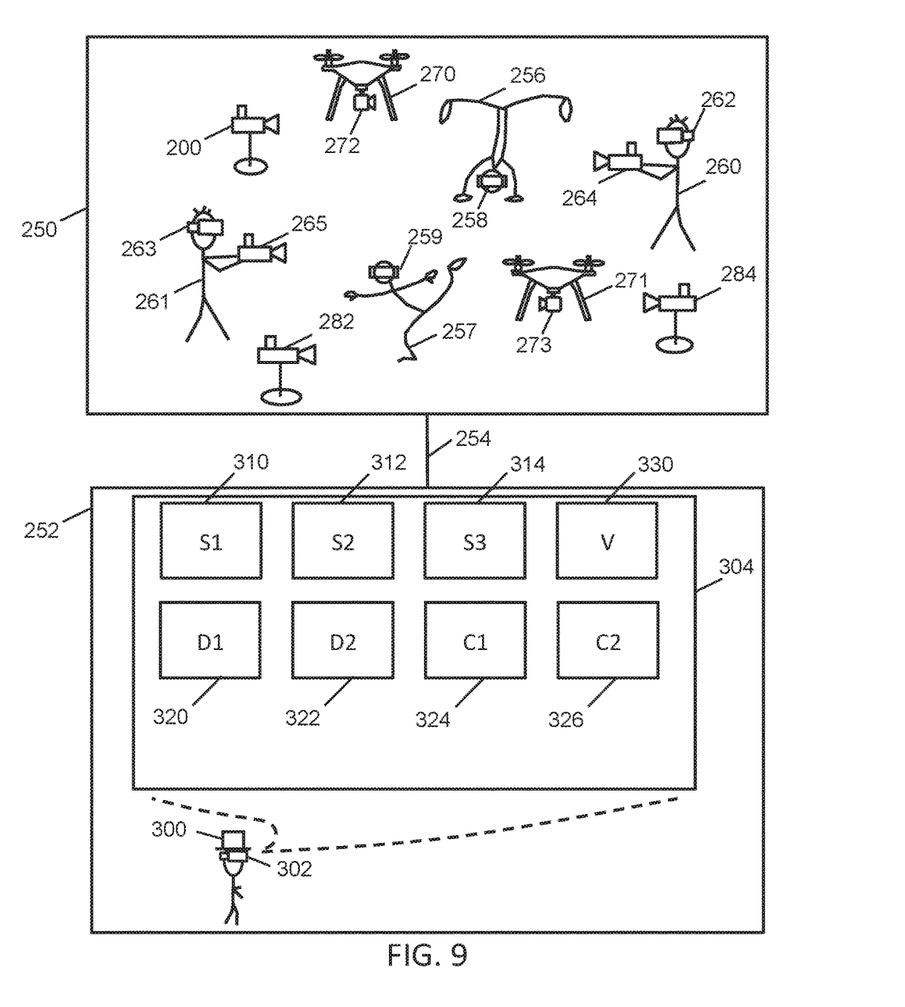
FIG. 9 is a schematic representation of a v-arena and the directing station, according to a third use-case of an embodiment of the present invention.

FIG. 9 shows an example of a third use-case of the system, which is an e-sports or v-sports scenario. In this, there is an acting station 250, which is a shared arena, and a directing station 252 connected to it via communications link 254.

Present in the same physical space at the acting station 250 are v-athletes 256, 257 each wearing their own wireless VR system, including a VR headset 258, 259. The v-athletes 256, 257 may be playing VR soccer, boxing, doing track and field events, performing gymnastics etc. There are cameramen 260, 261 each wearing a VR headset 262, 263 and operating a real, tracked camera 264, 265. Each cameraman captures images of a particular v-athlete and follows the v-athlete around while filming. Also present at the acting station 250 are drones 270, 271 each carrying a real camera 272, 273, each drone focused on a particular v-athlete. The drones 270, 271 are autonomous and follow artificial intelligence rules to track and react to the v-athletes as gameplay progresses. However, the drones 270, 271 are flown manually in other embodiments, either by personnel on-site or by remotely located personnel. Multiple static depth cameras 280, 282, 284 are also installed at the acting station 250, which capture 3D representations of multiple v-athletes simultaneously.

At the directing station 252, the director 300 wears a VR headset 302. In the display 304 of headset 302, multiple virtual screens are displayed, each with a video feed from one of the cameras in the acting station 250. Virtual screens 310, 312, 314 show feeds from the static depth cameras 280, 282, 284. Virtual screens 320, 322 display feeds from the cameras 272, 273 carried by the drones. Virtual screens 324, 326 display feeds from the cameras 264, 265 operated by the cameramen 260, 261. Virtual screen 330 is a feed from a virtual camera in the virtual reality arena in which the v-athletes are playing. As a background to the virtual screens, a 3D mixed reality view of the v-athletes composited into the virtual arena is displayed to the director.

In another embodiment, the director 300 does not wear a headset and virtual screens are replaced by real monitors.

Figure 10:
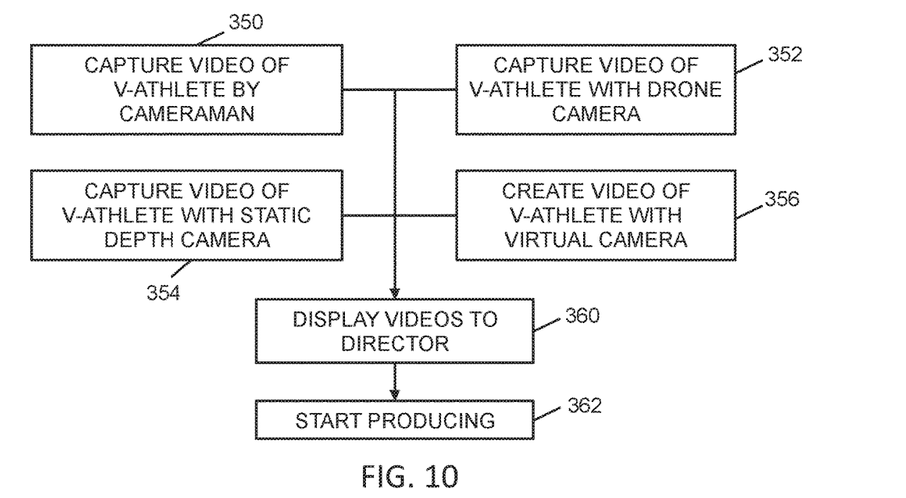
FIG. 10 is a flowchart of a process that occurs at the v-arena.

Referring to FIG. 10, a process is shown that corresponds to the filming of the virtual arena 250. In step 350, a cameraman captures an image of a v-athlete. In step 352, a drone camera captures an image of the v-athlete. In step 354, the static depth camera captures an image of the v-athlete. In step 356, a video stream of the v-athlete composited into the virtual arena is generated by a virtual camera. Steps 350, 352, 354 and 356 occur simultaneously. In step 360, the feeds from the real camera, drone camera, static depth camera and virtual camera are displayed to the director. In step 362, the director starts producing a film of the virtual arena by selecting between active cameras and cutting from feed to feed as the game in the arena progresses. Using this method, the director is able to produce a film in real time.

In another embodiment, the director is assisted by an automated or semi-automated process using heuristics, which are based on a variety of factors including player positions, gameplay, game state, and players statistics and popularity, and also modifiable by viewer statistics, to enable feeds to combine footage from multiple cameras more easily, and even to produce custom feeds for different viewers. Different feeds may be dependent on the viewer's country or favorite team or player, or may be defined by an individual viewer. In some embodiments, the director is fully replaced by a machine that automatically selects the active camera feeds to make the film.

D. Additional Processes

Figure 11:
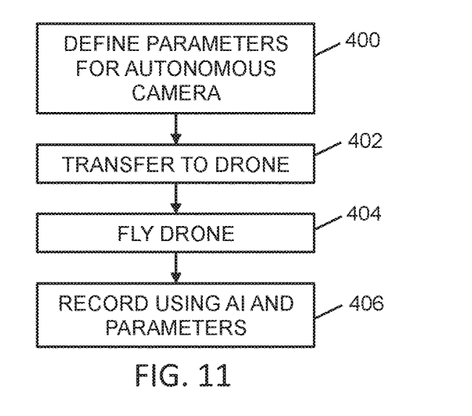
FIG. 11 is a flowchart of a process for using a drone according to an embodiment of the present invention.

FIG. 11 shows a process that is undertaken in the v-arena use-case. In step 400, flight and filming parameters are defined for an autonomous camera. In step 402, the parameters are transmitted or transferred to a drone that carries a real camera. In step 404, the drone flies according to the parameters. In step 406, the drone records footage according to the parameters and possibly artificial intelligence. The drone flies on a predetermined path; at a preset distance from the actor; on a predetermined path relative to a position of the actor; according to an artificial intelligence algorithm; according to face detection; or on a predetermined path in response to an action made by the actor.

Figure 12:
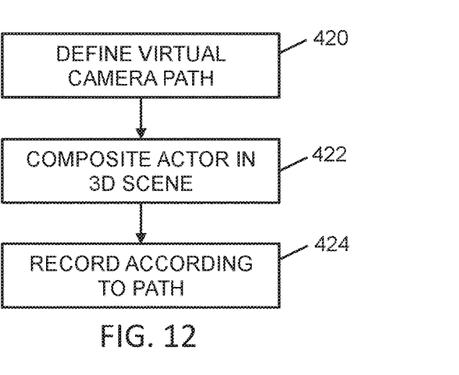
FIG. 12 is a flowchart of a process for defining a virtual camera path, according to an embodiment of the present invention.

FIG. 12 shows a virtual camera process that can be used in any of the use cases described above. In step 420, a path is defined for a virtual camera. In step 422, a projection of an actor is composited into a VR scene or a pre-recorded real scene. In step 424, the system creates footage from the virtual camera as it moves along the already defined path.

Figure 13:
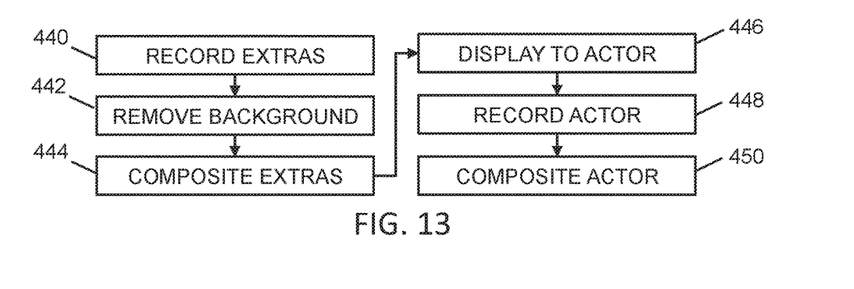
FIG. 13 is a flowchart of a process for recording with extras, according to an embodiment of the present invention.

FIG. 13 shows a process related to the filming of extras. In step 440, extras are recorded, either individually or as a group. In step 442, the background is removed from the recording of the extras. In step 444, the image of the extras is composited into a VR scene. In 446, the scene with composited extras is displayed to an actor. In step 448, the actor is recorded acting as if inhabiting the MR world with the composited extras. In step 450, the actor is composited into the 3D MR scene in which the extras are already composited.

Figure 14:
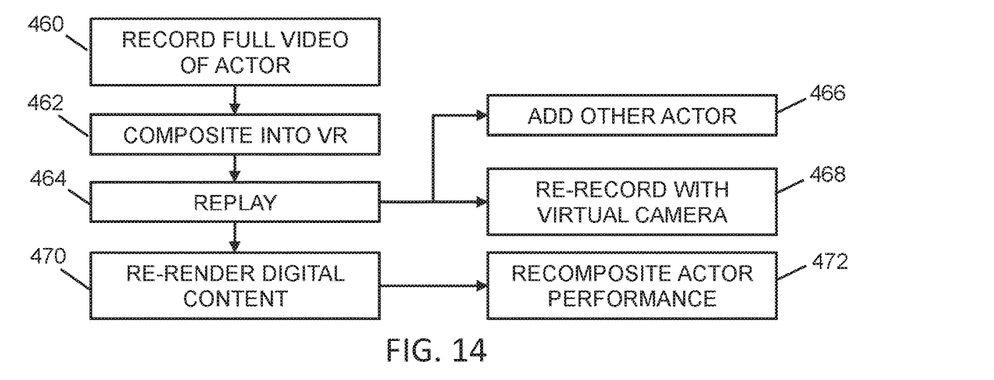
FIG. 14 is a flowchart of a process for adjusting videos, according to an embodiment of the present invention.

FIG. 14 shows a process that can be performed by the system to post-process a video. In step 460, a video of an actor is recorded. In step 462, an image of the actor is composited into a VR scene. In step 464, the composited scene is replayed, including replaying the recorded physical tracking information on a frame-accurate basis, in order to resimulate initial conditions. In step 466, another actor is composited into the scene. In step 468, the scene is re-recorded with a virtual camera from a different angle. In step 470, the digital assets in the scene are re-rendered. In step 472, the image or performance of the actor is recomposited, e.g. by adjusting the synchronization or the position of the composited addition to the VR scene. Step 472 may be done in response to the changes made in step 470, or it may be carried out without step 470 having been done. As well, actors already composited into the scene may be removed, or replaced with other actors.

Figure 15:
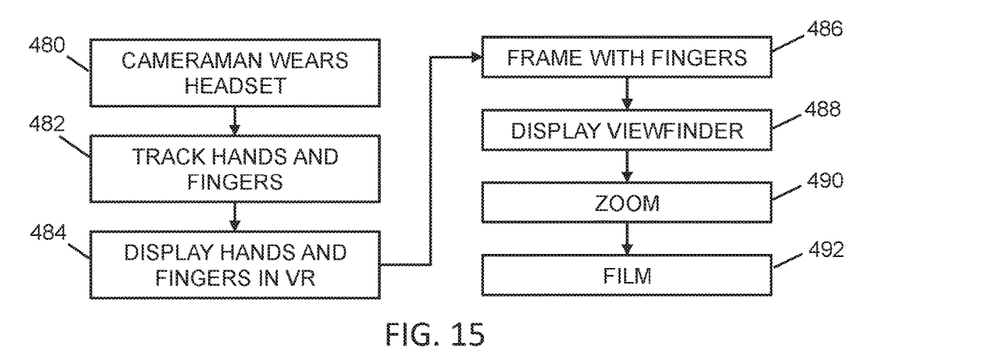
FIG. 15 is a flowchart of a process for framing a video using a virtual camera, according to an embodiment of the present invention.

FIG. 15 is a virtual camera process that can be performed by the system. In step 480, a cameraman puts on a VR headset that displays a VR scene. In step 482, hand tracking technology is used track the hands and fingers of the cameraman. In step 484, the system displays the cameraman's hands and fingers in the VR headset of the cameraman. In step 486, the cameraman forms a rectangular frame with his fingers (e.g. thumbs and forefingers), the frame representing a specific perspective in the virtual scene that the cameraman wants to capture. The distance from the frame to the cameraman's eyes is also used to determine an initial field of view parameter also. In step 488, the system displays a virtual viewfinder in the headset of the cameraman, the virtual viewfinder showing a clean-edged view of the field of view of a virtual camera that corresponds to the cameraman's finger frame and eye distance. The viewfinder is overlaid on the frame formed by the cameraman's fingers. Other finger movements may be used to zoom in and out in step 490, or voice commands may be used to control the zoom. In step 492, the cameraman starts to film using his fingers as a frame. This user interaction can be called upon in any scenario to specify a camera frustum (position, orientation, field of view, aspect ratio), and not just for on-the-fly camera motion control. For example, the user may be asked to specify a series of views which are then used to produce a continuous camera path.

E. Exemplary System

Figure 16:
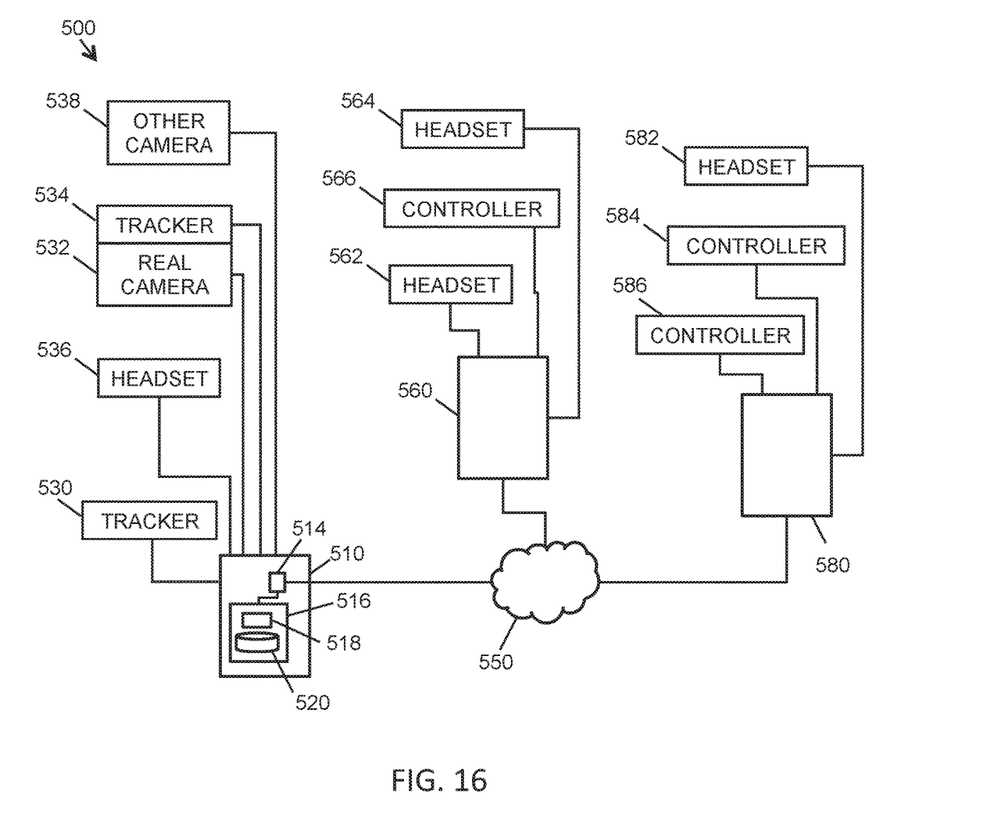
FIG. 16 is a schematic block diagram of a system for mixed reality cinematography, according to an embodiment of the present invention.

Referring to FIG. 16, there is shown an example of a system 500 that is used for mixed reality cinematography. The system 500 includes a computing device 510, which may be desktop or gaming computer, for example, or any other electronic device that provides the necessary equivalent functionality to fulfill the requirements of the invention. The computing device 510 includes a processor 514 which is operably connected to computer readable memory 516 included in the computing device. The system 500 includes computer readable instructions 518 (e.g. an application)

stored in the memory 516 and computer readable data 520, also stored in the memory. When the computer readable instructions 518 are executed by the processor 514, the processor performs one or more of the steps in the flowcharts disclosed herein. The memory 516 may be divided into one or more constituent memories, of the same or different types. The computing device 510 further includes interfaces operably connected to the processor 514, for connecting to external modules and devices.

Connected to the computing device 510 is a tracker 530 that is worn by an actor at an acting station. Also connected to the computing device 510 is a real camera 532, which may be a depth camera, for example. Attached to the depth camera 532 is a tracker 534, also connected to the computing device 510. A headset 536, worn by the cameraman operating the camera 532, is also connected to the computing device 510. One or more optional, additional cameras 538 for recording the actor are also connected to the computing device 510.

The computing device 510 is connected by network 550 to a further computing device 560 at a directing station that is remote from the acting station. The network 550 may, for example, be the internet, a telecommunications network, a local area network, a bespoke network or any combination of the foregoing. Communication paths in the network 550 may include any type of point-to-point or broadcast system or systems. The computing device 560 has a similar structure to computing device 510. Connected to computing device 560 are a headset 562 that is worn by a director, a headset 564 that is worn by a cameraman, and a controller 566 that is held by the cameraman to control a virtual camera.

System 500 also includes a third computing device 580 located at a set design station and connected via the network 550 to the computing device 510. The computing device 580 has a similar structure to computing device 510. Connected to the computing device 580 are a headset 582 worn by a set designer and two controllers 584, 586 held by the set designer.

F. Variations

While the present embodiments include the best presently contemplated mode of carrying out the subject matter disclosed and claimed herein, other embodiments are possible.

One of the tools that is used to enhance MR videos is a subject lighting tool. This tool creates lighting or shadows on a real subject that has been composited into a virtual scene, where the lighting and shadows are derived from elements in the virtual scene. For example, the lighting may be produced by a fire or a flashlight in the virtual world, and shadows may be created by vegetation in the virtual world.

One of the tools used to produce MR films is a real-world MR viewfinder built along the principles as disclosed in U.S. patent application Ser. No. 15/821,838 and incorporated herein by reference in its entirety. The real-world MR viewfinder shows, on a real screen, a camera's view of a real subject composited into a virtual environment, in real-time.

Some of the latest developments in hardware that can be employed in the present system include depth cameras, SLAM (simultaneous location and mapping), lighter weight and smaller profile headsets/contacts, hand tracking devices, full body tracking devices, inside-out tracking, inside-out SLAM, cordless devices, and support for wide variety of VR equipment such as XR Toolkit™.

Some of the latest developments in software that can be employed in the present system include 3D video subject instantiation; advances in background removal via artificial intelligence and use of depth cameras; natural language voice direction of cameras, sets, and actor positioning; deeper integrations with off-the-shelf performance capture evolutions, such as motion, face, and so on; material estimation for specular materials; and material lighting in general.

Video captured by real cameras may be processed beyond background removal to enhance the subject before they are composited in the virtual scene.

For example, headset removal and face replacement may be used to provide a more fulsome projection of the actors.

Depth cameras may be used to create more complete, volumetric actor representations, which enables virtual cameras to record actors with positional freedom since the actor's composition quality is now less perspective-dependent.

Motion capture devices (e.g. on arms, legs, hands etc.) may be used to capture an actor's movements that are used to drive a digital character. Virtual cameras then have full freedom to capture the digital characters. The digital characters' performances can then be manipulated by the described processes like any captured performance of real actors. Trackers may also be used on non-actor physical objects, such as machines, robots, vehicles and puppets. Tracking can allow for accurate interaction with virtual props using only the actors' hands, or the set designer's hands.

For example, a director of photography may don a VR headset and inhabit the 3D MR world with the director and one or more cameramen. Other movie production staff may also don VR headsets to join the MR world Where an avatar and symbol have been shown to represent the director and the camera of the second cameraman, real cameras may be used in some embodiments to capture images of the director and the second cameraman so that the system can composite images of them into the virtual world.

Multiple actors may be filmed, each at their own acting station remote from any other. They may even have a greenscreen set up in their home. Live performances from remote locations can be combined simultaneously into a scene, or recorded performances can be combined by an editor after capture has occurred.

Where a green screen has been shown, other methods of background removal may be employed without the use of a green screen, such as a distance cutoff with a depth camera.

In general, unless otherwise indicated, singular elements may be in the plural and vice versa with no loss of generality. The use of a specific gender can refer to masculine, feminine or both.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Two or more steps in the flowcharts may be performed in a different order, other steps may be added, or one or more may be removed without altering the main function of the invention. Steps shown to occur in parallel may be changed to occur sequentially and vice versa. Flowcharts from different figures may be combined in different ways. Modules may be divided into constituent modules or combined into larger modules. Screen shots may show more or less than the examples given herein. All configurations described herein are examples only and depend on the specific embodiment. Accordingly, the scope of the invention is to be construed in accordance with the substance defined by the following claims.

The invention claimed is:

1. A method for filming a video comprising the steps of:
    at a first location, creating a digital record of a scene;
    at a second location remote from the first location, capturing video imagery of an actor;
    compositing a representation of the actor taken from the video imagery into the digital record of the scene to form a composited scene;
    wherein the video imagery of the actor is captured by:
        recording the actor with a real camera while an operator of the real camera wears a first virtual reality (VR) headset and concurrently displaying, in the first VR headset:
            a first view of the composited scene that corresponds to a position and orientation of the first VR headset relative to a virtual world that is formed by the digital record of the scene; and
            a virtual viewfinder displaying a second view of the composited scene that corresponds to a position, orientation and field of view of the real camera relative to the virtual world; and
    at a third location remote from the first and second locations:
        displaying in a second VR headset a third view of the composited scene that corresponds to a position and orientation of the second VR headset relative to the virtual world that is displayed in the second VR headset; and
        displaying in a third VR headset a fourth view of the composited scene that corresponds to a position and orientation of the third VR headset relative to the virtual world that is displayed in the third VR headset;
    wherein the third view includes:
        a symbol of a virtual camera that is controlled by a wearer of the third VR headset, the symbol indicating a location and direction of the virtual camera; and
        a symbol representing the real camera and indicating a position and location of the real camera relative to the actor;
    wherein the fourth view includes an avatar of a wearer of the second VR headset.

2. The method of claim 1, wherein the second view forms the video that is filmed.

3. The method according to claim 1, comprising displaying in the first VR headset, another virtual viewfinder displaying a real view that is captured by the real camera.

4. The method according to claim 1, wherein the real camera is a tracked depth camera.

5. The method according to claim 1, wherein the video imagery of the actor is captured by further recording the actor with a further real camera simultaneously with the real camera, the video imagery comprising views from the two real cameras.

6. The method according to claim 5, wherein the further real camera is carried by a drone.

7. The method according to claim 6, comprising the drone flying:
    on a predetermined path;
    at a preset distance from the actor;
    on a predetermined path relative to a position of the actor;
    according to an artificial intelligence algorithm;
    according to face detection; or
    on a predetermined path in response to an action made by the actor.

8. The method according to claim 1, wherein the scene is a VR scene.

9. The method according to claim 8, further comprising at the first location and concurrently with capturing the video imagery:
    displaying in a fourth VR headset a fifth view of the composited scene that corresponds to a position and orientation of the fourth VR headset relative to the virtual world that is displayed in the fourth VR headset; and
    adjusting, by a wearer of the fourth VR headset and one or more controllers, a virtual prop in the VR scene.

10. The method of claim 9, comprising providing two-way audio links between a wearer of the second VR headset and wearers of the first VR headset and the fourth VR headset.

11. The method of claim 1, comprising displaying in the second headset:
    a virtual screen displaying the second view of the com posited scene;
    a virtual screen displaying a sixth view of the com posited scene that corresponds to a position, orientation and field of view of the virtual camera in the virtual world; and
    a virtual screen displaying a seventh view of the composited scene that corresponds to a position, orientation and field of view of an autonomous virtual camera in the virtual world.

12. The method of claim 11, wherein the autonomous virtual camera moves:
    on a predetermined path;
    at a preset distance from the representation of the actor;
    on a predetermined path relative to a position of the representation of the actor;
    according to an artificial intelligence algorithm;

according to face detection; or on a predetermined path in response to an action made by the actor.

13. The method of claim 1, wherein the virtual camera is controlled by a frame made by hands and fingers of the wearer of the fourth headset.

14. The method of claim 1, wherein the first location is a set design station, the second location is an acting station, and the third location is a director station.

15. The method according to claim 1, wherein the actor wears a tracker.

16. The method of claim 1, comprising compositing a representation of a further actor into the composited scene.

17. The method of claim 1, comprising:
replaying a recording of the virtual world composited with the actor; and
recording another video of the composited actor in the virtual world from another virtual camera.

18. The method according to claim 1, wherein the scene is a real, outdoor scene.

19. The method according to claim 18, comprising marking an actor location in the digital record of the scene.

20. The method according to claim 19, wherein the representation of the actor is composited at the marked actor location.

21. The method of claim 18, comprising displaying the second view on a real screen at the second location.

22. The method according to claim 18, comprising adding a virtual prop to the composited scene.

23. The method of claim 18, wherein the record of the digital scene is created using another real camera moving on a trajectory, the method further comprising moving the real camera to emulate the trajectory while recording the actor.

24. The method of claim 18, wherein the record of the digital scene is created using the real camera moving on a trajectory, the method further comprising moving the real camera to emulate the trajectory while recording the actor.

25. The method according to claim 1, wherein the scene is a virtual sports arena and the actor is a player in the virtual sports arena.

26. A system for filming a video comprising:
a computing device at a first location configured to create a digital record of a scene;
a real camera at a second location remote from the first location configured to capture video imagery of an actor;
a processor communicatively connected to the real camera and configured to:
access the digital record of the scene; and
composite a representation of the actor taken from the video imagery into the digital record of the scene to form a composited scene;
a first virtual reality (VR) headset at the second location connected to the processor and configured to display, to an operator of the real camera while the real camera records the actor:
a first view of the composited scene that corresponds to a position and orientation of the first VR headset relative to a virtual world that is formed by the digital record of the scene; and
a virtual viewfinder displaying a second view of the composited scene that corresponds to a position, orientation and field of view of the real camera relative to the virtual world; and
at a third location remote from the first and second locations:
a second VR headset configured to display a third view of the composited scene that corresponds to a position and orientation of the second VR headset relative to the virtual world that is displayed in the second VR headset;
a third VR headset configured to display a fourth view of the composited scene that corresponds to a position and orientation of the third VR headset relative to the virtual world that is displayed in the third VR headset;
wherein the third view includes:
a symbol of a virtual camera that is controlled by a wearer of the third VR headset, the symbol indicating a location and direction of the virtual camera; and
a symbol representing the real camera and indicating a position and location of the real camera relative to the actor;
wherein the fourth view includes an avatar of a wearer of the second VR headset.

27. The system of claim 26, wherein the second view forms the video that is filmed.

28. The system of claim 26, wherein the first VR headset is configured to display another virtual viewfinder displaying a real view that is captured by the real camera.

29. The system of claim 26, wherein the real camera is a tracked depth camera.

30. The system of claim 26, comprising a further real camera configured to capture, simultaneously with the real camera, a portion of the video imagery.

31. The system of claim 30, comprising a drone that carries the further real camera.

32. The system of claim 26, wherein the scene is a VR scene, the system further comprising:
a fourth VR headset at the first location configured to display a fifth view of the composited scene that corresponds to a position and orientation of the fourth VR headset relative to the virtual world that is displayed in the fourth VR headset; and
one or more controllers configured to adjust a virtual prop in the VR scene.

33. The system of claim 32, comprising two-way audio links between a wearer of the second VR headset and wearers of the first VR headset and the fourth VR headset.

34. The system of claim 26, wherein the second headset is configured to display:
a virtual screen displaying the second view of the composited scene;
a virtual screen displaying a sixth view of the composited scene that corresponds to a position, orientation and field of view of the virtual camera in the virtual world; and
a virtual screen displaying a seventh view of the composited scene that corresponds to a position, orientation and field of view of an autonomous virtual camera in the virtual world.

35. The system of claim 26, wherein the virtual camera is controlled by a frame made by hands and fingers of the wearer of the third headset.

36. The system of claim 26, wherein the first location is a set design station, the second location is an acting station, and the third location is a director station.

37. The system of claim 26 comprising a tracker for wearing by the actor.

38. The system of claim 26, wherein the processor is configured to:

replay a recording of the virtual world composited with the actor; and record, from another virtual camera, another video of the composited actor in the virtual world.

39. The system of claim 26, comprising a real screen at the second location, wherein:

the scene is a real, outdoor scene;

the digital record of the scene comprises a marker for an actor location;

the representation of the actor is composited at the marked actor location; and the second view is displayed on the real screen.

40. The system of claim 39, wherein the computing device is another real camera.

41. The system of claim 39, wherein the computing device and the real camera are combined in one module.

* * * * *